Patented July 25, 1944

2,354,579

UNITED STATES PATENT OFFICE 2,354,579

METHOD OF MANUFACTURING CERTAIN ACYLATED POLYAMINO ETHERS

Melvin De Groote, University City, and Bernhard Keiser, Webster Groves, Mo., assignors to Petrolite Corporation, Ltd., Wilmington, Del., a corporation of Delaware No Drawing. Application April 3, 1942, Serial No. 437,609

8 Claims. (Cl. 260—404.5)

The present invention is concerned primarily with a new procedure or method for producing certain aminoethers which either have not been previously available, or could not be prepared except by laborious methods, which involved either excessive cost, or else, a preponderance of cogeneric by-products.

Said new method of manufacturing the herein described aminoethers, is of utility, in view of the reaction products obtained. Such reaction products find employment in demulsification of crude oil emulsions, in de-salting practice in oil refineries, as break inducers in the doctor treatment of sour hydrocarbons, in acidification of calcareous oil-bearing strata, and for various other uses where cation-active reagents are employed.

The reactants employed in the present method consist of (a) Certain acylated aminoalcohols which must have at least one acyl radical derived from a monobasic detergent-forming acid, and at least one basic amino nitrogen atom, i. e., an amino nitrogen atom not directly linked to an acyl radical or an aryl radical. Such reactants may have more than one basic amino nitrogen atom, and may also have an ether linkage; and (b) Hydroxylated high molal amides having at least one hydroxy hydrocarbon radical or the equivalent, in which the carbon atom chain is interrupted at least once by oxygen and at least one amide-linked acyl radical derived from a monocarboxy detergent-forming acid.

The types of materials employed as reactants are well known.

In regard to the acylated aminoalcohols used as reactants, one type, a monoamino type, is described in U. S. Patent No. 2,225,824, dated December 24, 1940, to De Groote and Wirtel. Said patent describes in detail the manufacture of compounds of the following formula:

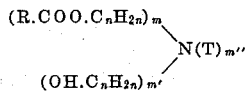

in which R.COO represents the oxyacyl radical derived from a monobasic detergent-forming acid; T represents a hydrogen atom or a non- hydroxy hydrocarbon radical or the acylated radical obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1 or 2; and $m''$ represents the numeral 0, 1, or 2, with the proviso that $$m+m'+m'' \text{ equals } 3.$$

A similar type of compound, which contains an ether linkage, is described in U. S. Patent No. 2,259,704, dated October 21, 1941, to Monson & Anderson. In said patent there is a description of acylated aminoethers containing (a) A radical derived from a basic hydroxyaminoether, and said radical being of the kind containing at least one amino nitrogen free from attached aryl and amido-linked acyl radicals; said hydroxyaminoether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyaminoether radical being characterized by containing not over 60 carbon atoms; and (b) an acyl radical derived from a detergent-forming monocarboxy acid having at least 8 carbon atoms and not more than 32 carbon atoms; said acylated aminoether being additionally characterized by the fact that said aforementioned acyl radical is a substituent for a hydrogen atom of an alcoholic hydroxy radical.

Although primarily, raw materials, such as triethanolamine, ethyldiethanolamine, and the like, are most frequently employed in the manufacture of the acylated aminoalcohol, it is understood that such materials may be reacted with an oxyethylating agent, such as ethylene oxide, propylene oxide, or the like, to produce comparable materials which also are well known compounds. (See also U. S. Patents Nos. 2,228,986, 7, 8 and 9, all dated January 4, 1941, to De Groote, Keiser and Blair). If desired, the acylated aminoalcohols of the kind previously described may be subjected to a subsequent oxyalkylation step, i. e., treatment with ethylene oxide or the like. For example, the ester derived from ricinolic acid and triethanolamine could be subjected to treatment with ethylene oxide, propylene oxide, or the like. As has been previously pointed out, such acylated aminoalcohols containing at least one basic amino nitrogen atom, need not be obtained from monoamines, or monoaminoalcohols, but may, in fact, be obtained from polyaminoalcohols. Thus, hydroxyethyl ethylenediamine may be treated with three moles of ethylene oxide, so as to obtain tetra(hydroxyethyl)ethylenediamine. Such product can be readily acylated with a high molal detergent-forming acid. Similarly, diethylenetriamine can be treated with four moles of ethylene oxide, so as to yield a tetra-substituted product. The compound obtained can be acylated with two moles of a suitably selected detergent-forming acid, for example, a higher fatty acid, to give a suitable acylated aminoalcohol having at least two basic nitrogen atoms. Furthermore, in the broadest aspect, one is not limited to acylated derivatives in which the acyloxy radical of the detergent-forming acid enters into the aminoalcohol, but one may employ compounds in which the acyl group, as distinguished from the acyloxy group, is introduced into the amino reactant. For example, ethylenediamine, or diethylenetriamine, may be treated with a detergent-forming monocarboxy acid, so as to yield the acylated polyamine. Such polyamine can then be treated with ethylene oxide or the like, so as to convert it into an aminoalcohol. Insofar that there are two or more amino nitrogen atoms present, obviously, there must be at least one basic nitrogen atom, provided that only partial amidification has been employed.

As to the hydroxylated high molal amides, one is concerned with the type of material which may be obtained as the oxyalkylation derivative of the corresponding amide or substituted amide. For instance, any high molal acid or its equivalent may be reacted with ammonia or the like to produce an amide by conventional procedure. However, amides, instead of being obtained from ammonia, may be obtained from primary amines, such as amines in which a hydrogen atom linked to a nitrogen atom has been replaced by an alkyl radical, an aralkyl radical, an alicyclic radical, an alkylol radical, or the type of radical in which the carbon chain has been interrupted at least once by an oxygen atom. Examples of such amines are amylamine, cyclohexylamine, benzylamine, monoethanolamine, tris(hydroxymethyl)aminomethane, etc. Polyamino types may also be employed, such as ethylenediamine, bis(hydroxyethyl)ethylenediamine, etc. If one starts with ammonia, or an amine free from a hydroxylated radical, it is obvious that the amides so obtained, for instance, oleoamide, ricinoleoamide, amyloleoamide, amylricinoleoamide, or the like, can be treated with one or more moles of an oxyethylating agent, such as ethyleneoxide, propyleneoxide, butyleneoxide, glycid, or the like, to give a high molal substituted amide having at least one monocarboxy detergent-forming acid acyl radical and at least one hydroxylated hydrocarbon group, or the equivalent, wherein the carbon atom chain is interrupted at least once by oxygen. The amine need not be basic, and thus aniline, phenylethanolamine, or the like, may also be employed as a primary reactant.

Obviously, however, amides can be obtained as conveniently from a fatty acid, for example, in monoethanolamine, as would be possible by first reacting the fatty acid or its equivalent, such as the ester, with ammonia, and then subjecting the unsubstituted amide to oxyethylation. The production of such amides, and, as a matter of fact, polyamides derived from suitable polyamines, is well known and requires no further elaboration. The presence of a basic nitrogen atom, i. e., a nitrogen atom not directly linked to either an aryl group, or an acyl radical, is not objectionable, and may be desirable. For instance, one might react hydroxyethyl ethylenediamine with ricinoleic acid, so as to introduce the acyl radical, as distinguished from the acyloxy radical. It is to be noted that some of the high molal substituted amides are polyfunctional, in that two or more hydroxy hydrocarbon radicals or their equivalents are introduced. Furthermore, there is no objection to using the oxyethylating agent in substantial multiple proportions, i. e., there is no objection to introducing an ether linkage which recurs a number of times.

The monocarboxy detergent-forming acids are characterized by having at least 8 carbon atoms and not more than 32 carbon atoms, and are exemplified by fatty acids, naphthenic acids, abietic acids, acids obtained by the oxidation of petroleum or wax, and the like, or simple modifications thereof which do not detract from the ability of the acid to combine with alkali to produce soap or soap-like materials. For instance, hydrogenated oleic acid, chlorinated naphthenic acid, or brominated abietic acid, will form such detergent-like bodies with the same ease as the parent material itself. The oxidized acids obtained by blowing or oxidation of the acids or esters are satisfactory. Such acids have frequently been referred to collectively in the art as "monocarboxy detergent acids." Needless to say, the acylation need not be conducted by means of the acid itself, but may be conducted by means of any compound of the acid which contains the acyl radical; for instance, an ester, an amide, an anhydride, an acyl chloride, etc.

Preferably, the reactants employed are derived from fatty acids, particularly unsaturated fatty acids, rather than some other source of a high molal acyl radical. Our preference is to use such materials as castor oil, ricinoleic acid, oleic acid, sunflowerseed oil, soyabean oil, teaseed oil, linseed oil and the like. This is true, regardless of whether the high molal acyl group is introduced into the aminoalcohol or into the amide reactant.

Although the reactants employed are well known, a few examples will be given.

BASIC ACYLATED AMINOALCOHOLS

*Example 1*

Ricinoleic acid is reacted with triethanolamine in the conventional manner to give a compound of the following formula:

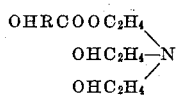

BASIC ACYLATED AMINOALCOHOLS

*Example 2*

The same procedure is followed as in the preceding example, except that the triethanolamine is treated with three moles of ethylene oxide prior to acylation with ricinoleic acid. Such compound may be indicated by the following formula:

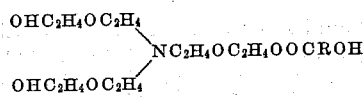

in which OHRCO is the ricinoleyl radical.

BASIC ACYLATED AMINOALCOHOLS

Example 3

Ethyldiethanolamine is substituted for triethanolamine in Examples 1 and 2, preceding. Such compound may be illustrated by the following formula:

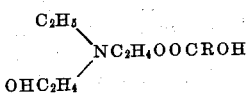

in which OHRCO is the ricinoleyl radical.

BASIC ACYLATED AMINOALCOHOLS

Example 4

Triisopropanolamine or propyldi-isopropanolamine is employed, following the same procedure as described in Examples 1 to 3, preceding. Such compound may be illustrated by the following formula:

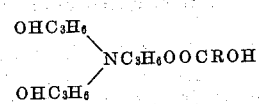

in which OHRCO is the ricinoleyl radical.

BASIC ACYLATED AMINOALCOHOLS

Example 5

Hydroxyethyl ethylenediamine is reacted with three moles of ethylene oxide and then with one mole of ricinoleic acid, so as to give a compound of the following composition:

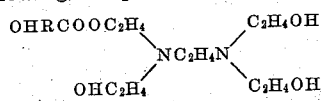

BASIC ACYLATED AMINOALCOHOLS

Example 6

Diethylenetriamine is treated with four moles of ethylene oxide and then with two moles of ricinoleic acid.

The compounds described in the preceding examples are well known compositions and the method of preparation is well known.

HYDROXYLATED SUBSTITUTED HIGH MOLAL AMIDES

Example 1

One pound mole of ricinoleic acid is reacted with one pound mole of monoethanolamine to give the corresponding amide. Such amide may be illustrated by the following formula:

in which RCO is the ricinoleyl radical.

HYDROXYLATED SUBSTITUTED HIGH MOLAL AMIDES

Example 2

One pound mole of ricinoleic acid is reacted with one pound mole of diethanolamine to give the corresponding amide. Such amide may be illustrated by the following formula:

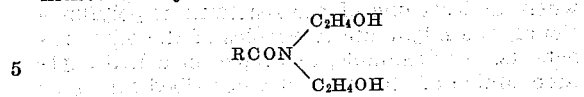

in which RCO is the ricinoleyl radical.

HYDROXYLATED SUBSTITUTED HIGH MOLAL AMIDES

Example 3

One pound mole of ricinoleic acid is reacted with one pound mole of 2-amino-2-methyl-1,3-propanediol to give the corresponding amide. Such amide may be illustrated by the following formula:

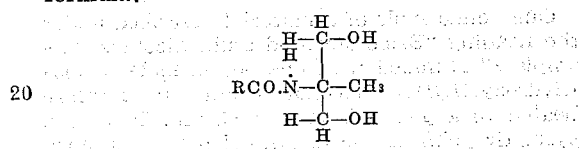

in which RCO is the ricinoleyl radical.

HYDROXYLATED SUBSTITUTED HIGH MOLAL AMIDES

Example 4

One pound mole of ricinoleic acid is reacted with one pound mole of 2-amino-2-ethyl-1,3-propanediol to give the corresponding amide.

HYDROXYLATED SUBSTITUTED HIGH MOLAL AMIDES

Example 5

One pound mole of ricinoleic acid is reacted with one pound mole of tris(hydroxymethyl)-aminomethane to give the corresponding amide.

HYDROXYLATED SUBSTITUTED HIGH MOLAL AMIDES

Example 6

One pound mole of ricinoleic acid is reacted with one pound mole of hydroxyethyl ethylenediamine to give the corresponding amide.

HYDROXYLATED SUBSTITUTED HIGH MOLAL AMIDES

Example 7

One pound mole of diethylenetriamine is reacted with one pound mole of ricinoleic acid to give the corresponding amide, which is then reacted with one pound mole of ethylene oxide to give the corresponding hydroxyethylamide.

We have found that if one mixes the types of materials indicated in low molar proportions, for instance, mole for mole, in any instance, and two moles to a single mole where there is a multiple of functional groups, one can then heat such mixtures to a point below the pyrolytic point of either reactant alone, and obtain etherization with the elimination of one or more moles of water. In other words, if one were to take a hydroxylated high molal amide of the kind described, for instance, hydroxyethyloleoamide, one might find that it would have to be heated to a temperature of 300° C., or higher, before marked etherization took place. Similarly, one might heat a basic acylated aminoalcohol, for instance, the derivative obtained by one mole of ricinoleic acid with one mole of triethanolamine to a temperature short of its pyrolytic point, for instance, 270° C., without the elimination of a mole of water, and yet, if one mixes a mixture of the two reactants in equal molar proportions, and heats the same, one will find that water can be eliminated readily at a temperature considerably lower than the pyrolytic point of either reactant.

For instance, such mixture might only be heated to a temperature of 225°–270° C. Needless to say, where at least one of the reactants is polyfunctional, one might use two moles of the other reactants. For example, two moles of a hydroxylated amide of the kind just described might be reacted with one mole of a material described under the heading "Basic acylated aminoalcohols, Example 6." Likewise, the reactants can be so selected that one can use two moles of the amide for one mole of the alcohol. Our preference, however, is to use mole for mole, regardless of whether the reactants are polyfunctional or not.

ETHERIZATION PROCEDURE
Example 1

One pound mole of a material described under the heading "Basic acylated aminoalcohols, Example 1" is mixed with one pound mole of bis-(hydroxyethyl) ricinoleoamide and the mixture heated to a point above 200° C. and below the pyrolytic point of the individual reactants, until etherization has taken place with elimination of water. 4 to 20 hours may be required. Although more complicated reactions may take place, one of the simplest aspects of the reaction may be indicated in the following manner:

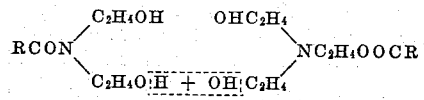

in which RCO is the ricinoleyl radical.

ETHERIZATION PROCEDURE
Example 2

The same procedure is employed, except that instead of employing the material described under the heading "Basic acylated aminoalcohols, Example 1," one employs a material of the kind described under the headings "Basic acylated aminoalcohols, Examples 2 to 4," inclusive. Although more complicated reactions may take place, one of the simplest aspects of the reaction may be indicated in the following manner:

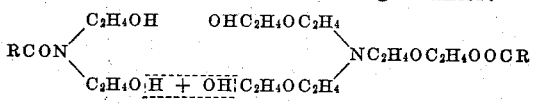

in which RCO is the ricinoleyl radical.

ETHERIZATION PROCEDURE
Example 3

The same procedure is employed, except that instead of employing the material described under the heading "Basic acylated aminoalcohols, Example 1," one employs a material of the kind described under the headings "Basic acylated aminoalcohols, Examples 5 and 6." Although more complicated reactions may take place, one of the simplest aspects of the reaction may be indicated in the following manner:

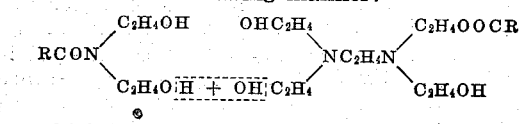

in which RCO is the ricinoleyl radical.

ETHERIZATION PROCEDURE
Example 4

The same procedure is followed as in Example 3, preceding, except that one employs two pound moles of the amide for each pound mole of the acylated aminoalcohol.

ETHERIZATION PROCEDURE
Example 5

One pound mole of oleoamide is treated with one pound mole of ethylene oxide. One pound mole of the material so obtained is reacted with one pound moles of the acylated amino alcohol obtained by reaction between ricinoleic acid and triethanolamine in equal molar proportions. Amyloleoamide may be employed instead of oleoamide.

The products obtained in the above manner may be employed as such for various purposes indicated, or may be used as intermediate reactions in the production of more complex compounds. Being basic in nature, they can combine with any suitable acids, such as hydrochloric acid, acetic acid, lactic acid, or the like, to produce acid salts. Many of such acid salts have pronounced emulsifying and surface tension depressant qualities.

It is recognized that etherization could take place between two moles of the same kind of reactant, but it is our opinion that the etherization which takes place is substantially heteromolecular etherization, i. e., etherization involving two dissimilar molecules.

Attention is directed to our co-pending applications Serial Nos. 437,608 and 437,610, both filed April 3, 1942.

Having thus described our invention, what we claim as new and desire to secure by Letters Patent is:

1. In the method of manufacturing acylated polyaminoethers having at least two monocarboxy detergent-forming acid acyl radicals and at least two amino nitrogen atoms, including at least one basic amino nitrogen atom, the step of heating a mixture of (a) an acylated aminoalcohol having at least one basic nitrogen atom and at least one monocarboxy detergent-forming acid acyl radical containing at least 8 carbon atoms and not more than 32 carbon atoms; and (b) a substituted amide having a monocarboxy detergent-forming acid acyl radical containing at least 8 carbon atoms and not more than 32 carbon atoms; and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

2. In the method of manufacturing acylated polyaminoethers having at least two monocarboxy detergent-forming acid acyl radicals and at least two amino nitrogen atoms, including at least one basic amino nitrogen atom, the step of heating a mixture of (a) an acylated monoaminoalcohol having at least one basic nitrogen atom and at least one monocarboxy detergent-forming acid acyl radical containing at least 8 carbon atoms and not more than 32 carbon atoms; and (b) a substituted amide having a monocarboxy detergent-forming acid acyl radical containing at least 8 carbon atoms and not more than 32 carbon atoms; and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

3. In the method of manufacturing acylated polyaminoethers having at least two monocarboxy detergent-forming acid acyl radicals and at least two amino nitrogen atoms, including at least one basic amino nitrogen atom, the step of heating a mixture of (a) an acylated monoaminoalcohol having at least one basic nitrogen atom and at least one monocarboxy detergent-forming acid acyl radical containing at least 8 carbon atoms and not more than 32 carbon atoms; and (b) a substituted monoaminoamide having a monocarboxy detergent-forming acid acyl radical containing at least 8 carbon atoms and not more than 32 carbon atoms; and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

4. In the method of manufacturing acylated polyamino ethers having at least two monocarboxy detergent-forming acid acyl radicals and at least two amino nitrogen atoms, including at least one basic amino nitrogen atom, the step of heating an equimolar mixture of (a) an acylated monoaminoalcohol having at least one basic nitrogen atom and at least one monocarboxy detergent-forming acid acyl radical containing at least 8 carbon atoms and not more than 32 carbon atoms; and (b) a substituted monoaminoamide having a monocarboxy detergent-forming acid acyl radical containing at least 8 carbon atoms and not more than 32 carbon atoms; and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

5. In the method of manufacturing acylated polyaminoethers having at least two higher fatty acid acyl radicals and at least two amino nitrogen atoms, including at least one basic amino nitrogen atom, the step of heating an equimolar mixture of (a) an acylated monoaminoalcohol having at least one basic nitrogen atom and at least one higher fatty acid acyl radical containing at least 8 carbon atoms and not more than 32 carbon atoms; and (b) a substituted monoaminoamide having a fatty acid acyl radical containing at least 8 carbon atoms and not more than 32 carbon atoms; and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

6. In the method of manufacturing acylated polyamino ethers having at least two unsaturated higher fatty acid acyl radicals and at least two amino nitrogen atoms, including at least one basic amino nitrogen atom, the step of heating an equimolar mixture of (a) an acylated monoaminoalcohol having at least one basic nitrogen atom and at least one unsaturated fatty acid acyl radical containing at least 8 carbon atoms and not more than 32 carbon atoms; and (b) a substituted monoaminoamide having an unsaturated higher fatty acid acyl radical containing at least 8 carbon atoms and not more than 32 carbon atoms; and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

7. In the method of manufacturing acylated polyaminoethers having at least two unsaturated higher fatty acid acyl radicals containing 18 carbon atoms and at least two amino nitrogen atoms, including at least one basic amino nitrogen atom, the step of heating an equimolar mixture of (a) an acylated monoaminoalcohol having at least one basic nitrogen atom and at least one unsaturated fatty acid acyl radical containing 18 carbon atoms; and (b) a substituted monoaminoamide having an unsaturated fatty acid acyl radical containing 18 carbon atoms; and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

8. In the method of manufacturing acylated polyaminoethers having at least two ricinoleyl radicals and at least two amino nitrogen atoms, including at least one basic amino nitrogen atom, the step of heating an equimolar mixture of (a) an acylated monoaminoalcohol having at least one basic nitrogen atom and at least one ricinoleyl radical; and (b) a substituted monoaminoamide having a ricinoleyl radical; and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

MELVIN DE GROOTE.
BERNHARD KEISER.